(12) United States Patent
Kim et al.

(10) Patent No.: US 8,841,022 B2
(45) Date of Patent: Sep. 23, 2014

(54) TERMINAL OF SECONDARY BATTERY AND METHOD OF ASSEMBLING THE SAME

(75) Inventors: Dukjung Kim, Yongin-si (KR); Minhyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 536 days.

(21) Appl. No.: 13/170,048

(22) Filed: Jun. 27, 2011

(65) Prior Publication Data

US 2012/0276442 A1 Nov. 1, 2012

Related U.S. Application Data (60) Provisional application No. 61/480,195, filed on Apr. 28, 2011.

(51) Int. Cl.

| | |
|---|---|
| *H01M 2/02* | (2006.01) |
| *H01M 2/26* | (2006.01) |
| *H01M 2/20* | (2006.01) |
| *H01M 2/04* | (2006.01) |
| *H01M 2/30* | (2006.01) |
| *H01M 10/052* | (2010.01) |

(52) U.S. Cl.
CPC .............. *H01M 2/305* (2013.01); *H01M 2/266* (2013.01); *H01M 10/052* (2013.01); *H01M 2/202* (2013.01); *H01M 2/0473* (2013.01); *Y02T 10/7011* (2013.01); *Y02E 60/12* (2013.01); *H01M 2/02* (2013.01); *H01M 2/263* (2013.01)
USPC .......................................... 429/179; 429/178

(58) Field of Classification Search
CPC ....... H01M 2/30; H01M 2/10; H01M 2/0473; H01M 2/202; H01M 2/263; H01M 2/305; H01M 2/266; H01M 2/02; H01M 10/052; Y02T 10/7011; Y02E 60/12
USPC .......................................................... 429/179
See application file for complete search history.

(56) References Cited

U.S. PATENT DOCUMENTS

| | | | |
|---|---|---|---|
| 2009/0186269 A1 | 7/2009 | Kim et al. | |
| 2010/0081048 A1* | 4/2010 | Nansaka et al. | ............. 429/158 |

(Continued)

FOREIGN PATENT DOCUMENTS

| | | | | |
|---|---|---|---|---|
| JP | 2000-138055 | | 5/2000 | |
| JP | 2000138055 A | * | 5/2000 | .............. H01M 2/30 |

(Continued)

OTHER PUBLICATIONS

Extended European Search Report dated Apr. 5, 2012 for corresponding European Patent Application No. 11179441.8, 7pp.

(Continued)

*Primary Examiner* — Gary Harris
(74) *Attorney, Agent, or Firm* — Christie, Parker & Hale, LLP (57) ABSTRACT

A secondary battery includes an electrode assembly; a first terminal electrically connected to the electrode assembly, wherein the first terminal includes a first collecting plate contacting the electrode assembly and having at least one opening; a first terminal plate comprising at least one protrusion extending into the at least one opening; and a first coupling terminal extending through the first terminal plate and electrically coupled to the first collecting plate; a case housing the electrode assembly; and a cap assembly sealing the case.

18 Claims, 7 Drawing Sheets

(56) References Cited

U.S. PATENT DOCUMENTS

| | | | |
|---|---|---|---|
| 2010/0143786 A1* | 6/2010 | Kim | 429/158 |
| 2010/0159320 A1* | 6/2010 | Kim et al. | 429/178 |
| 2011/0183193 A1 | 7/2011 | Byun et al. | |
| 2011/0244317 A1 | 10/2011 | Lee et al. | |
| 2011/0287291 A1 | 11/2011 | Byun et al. | |
| 2011/0305928 A1 | 12/2011 | Kim et al. | |
| 2012/0058388 A1 | 3/2012 | Kim et al. | |
| 2012/0100419 A1* | 4/2012 | Byun et al. | 429/179 |

FOREIGN PATENT DOCUMENTS

| | | |
|---|---|---|
| JP | 2009-252395 | 10/2009 |
| JP | 2011-076871 | 4/2011 |
| JP | 2011-243560 | 12/2011 |
| JP | 2011-258550 | 12/2011 |
| KR | 10-2007-0014633 | 2/2007 |
| KR | 10-0776766 | 11/2007 |
| KR | 10-2009-0081197 | 7/2009 |
| KR | 10-1042808 | 6/2011 |
| KR | 10-2012-0025855 | 3/2012 |
| KR | 10-2012-0042602 | 5/2012 |

OTHER PUBLICATIONS

JPO Office action dated Jun. 11, 2013, for corresponding Japanese Patent application 2011-189416, (2 pages).

Patent Abstracts of Japan, and English machine translation of Japanese Publication 2009-252395, dated Oct. 29, 2009, listed above, (21 pages).

Korean Notice of Allowance dated Nov. 14, 2012 issued in corresponding Korean Patent Application No. 10-2011-0070506, 5 pages.

SIPO Office action dated Mar. 4, 2014, with English translation, corresponding to Chinese Patent application 201110245612.3, (20 pages).

Patent Abstracts of Japan, and English machine translation of Japanese Publication dated Apr. 14, 2011, listed above, (11 pages).

* cited by examiner

TERMINAL OF SECONDARY BATTERY AND METHOD OF ASSEMBLING THE SAME

CROSS-REFERENCE TO RELATED APPLICATION

This application claims the benefit of U.S. Provisional Application No. 61/480,195, filed on Apr. 28, 2011, in the United States Patent and Trademark Office, the disclosure of which is incorporated herein in its entirety by reference.

BACKGROUND

1. Field

Embodiments relate to a terminal of a secondary battery and a method of assembling the terminal.

2. Description of the Related Art

Secondary batteries are rechargeable unlike primary batteries. Among such secondary batteries, a low capacity battery including a battery cell in the form of a pack may be used for small portable electronic devices such as cellular phones and camcorders, and a high capacity battery including dozens of battery cells connected to one another may be used as a motor-driving power source for electric scooters, hybrid vehicles, or electric vehicles.

Secondary batteries are manufactured in various shapes such as a cylindrical shape and a prismatic shape. A secondary battery is typically constructed as follows: an electrode assembly formed by inserting an insulating separator between positive and negative electrode plates is placed in a case together with electrolyte; and a cap plate is on the case. The electrode assembly is connected to positive and negative terminals which protrude from the cap plate and are exposed to the exterior of the secondary battery.

SUMMARY

An aspect of the present invention provides a terminal of a secondary battery in which a collecting plate and a terminal plate are coupled using a coupling terminal to improve the electricity collecting efficiency and coupling force, and a method of assembling the terminal.

A secondary battery includes an electrode assembly; a first terminal electrically connected to the electrode assembly, wherein the first terminal includes a first collecting plate contacting the electrode assembly and having at least one opening; a first terminal plate comprising at least one protrusion extending into the at least one opening; and a first coupling terminal extending through the first terminal plate and electrically coupled to the first collecting plate; a case housing the electrode assembly; and a cap assembly sealing the case.

In one embodiment, the first terminal plate has a plurality of protrusions and the first collecting plate has a plurality of openings. Further, in one embodiment, the first collecting plate has a terminal opening through which the first coupling terminal protrudes. A first coupling ring may be located between the first collecting plate and the first coupling terminal.

In one embodiment, the first terminal plate has a coupling opening configured to accommodate the first coupling terminal, and the coupling opening may be threaded. Further, in one embodiment, n the first terminal plate has a pressing section that is compressed against the first coupling terminal.

In one embodiment, the secondary battery further includes a second terminal electrically connected to the electrode assembly, wherein the second terminal includes a second collecting plate contacting the electrode assembly and having at least one opening; a second terminal plate comprising at least one protrusion extending into the at least one opening of the second terminal plate; and a second coupling terminal extending through the second terminal plate and electrically coupled to the second collecting plate.

In one embodiment, the first coupling terminal and the first terminal plate are made from different materials and in one embodiment, the first coupling terminal has a greater strength than the first terminal plate.

Further, in one embodiment the cap assembly includes a cap plate, wherein the first terminal plate extends into the cap plate.

According to the terminal of the secondary battery and the method of assembling the terminal, the collecting plate and the terminal plate are coupled using the coupling terminal so that the electricity collecting efficiency and coupling force of the secondary battery can be improved.

According to the terminal of the secondary battery and the method of assembling the terminal, the collecting plate and the terminal plate are electrically connected through the coupling terminal so that a current passage can be shortened to reduce terminal electric resistance.

According to the terminal of the secondary battery and the method of assembling the terminal, the terminal plate and the coupling terminal are coupled by a bolt-nut structure and pressed so that the coupling terminal may not be rotated when a bus bar or a nut is coupled to the coupling terminal.

According to the terminal of the secondary battery and the method of assembling the terminal, since a current flows from the collecting plate to a bus bar through the terminal plate having a relatively large sectional area, the electric resistance of the terminal can be reduced owing to the wide current passage.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Hereinafter, embodiments will be described in detail with reference to the accompanying drawings.

Figure 1:
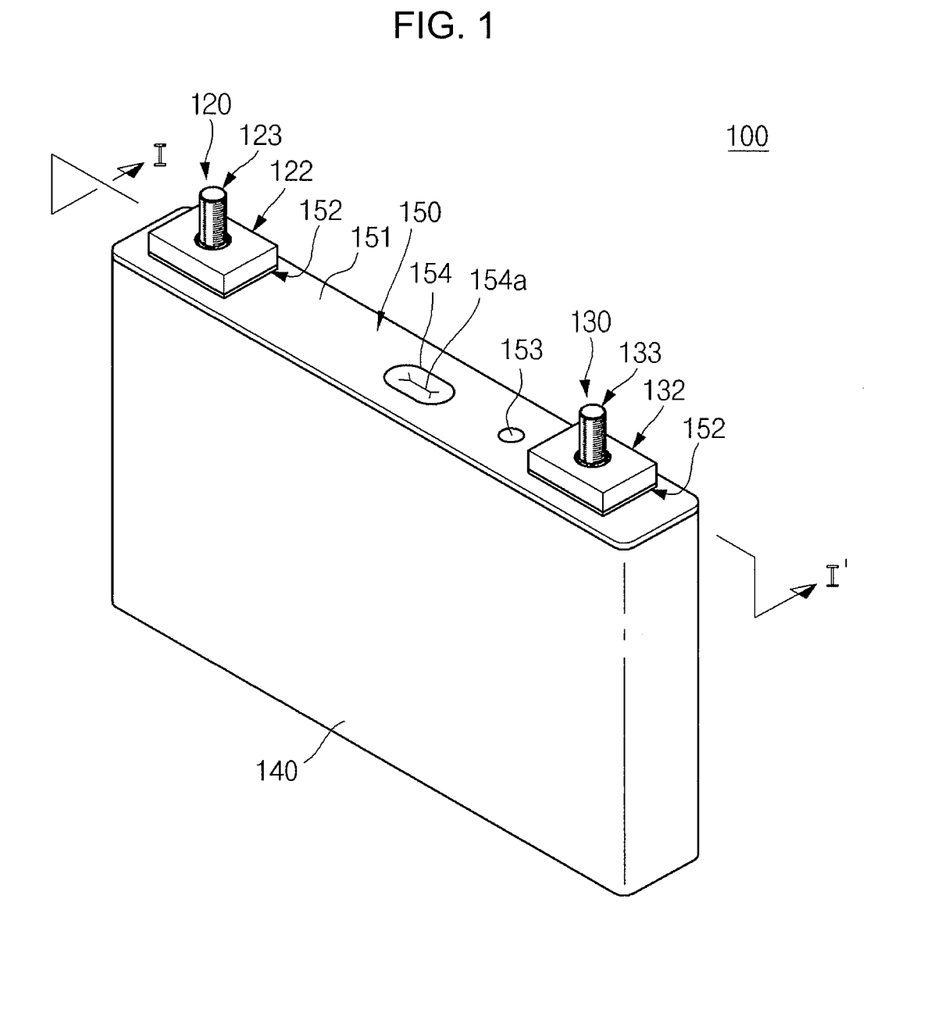
FIG. 1 is a perspective view illustrating a secondary battery according to an embodiment.
Figure 2:
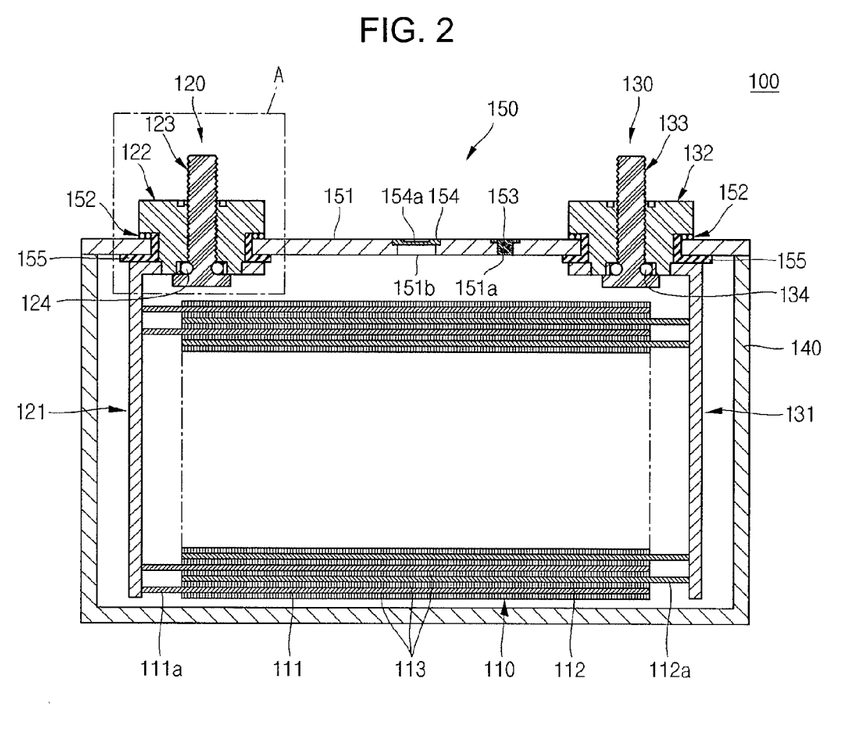
FIG. 2 is a sectional view of the secondary battery taken along line I-I' of FIG. 1.
Figure 3:
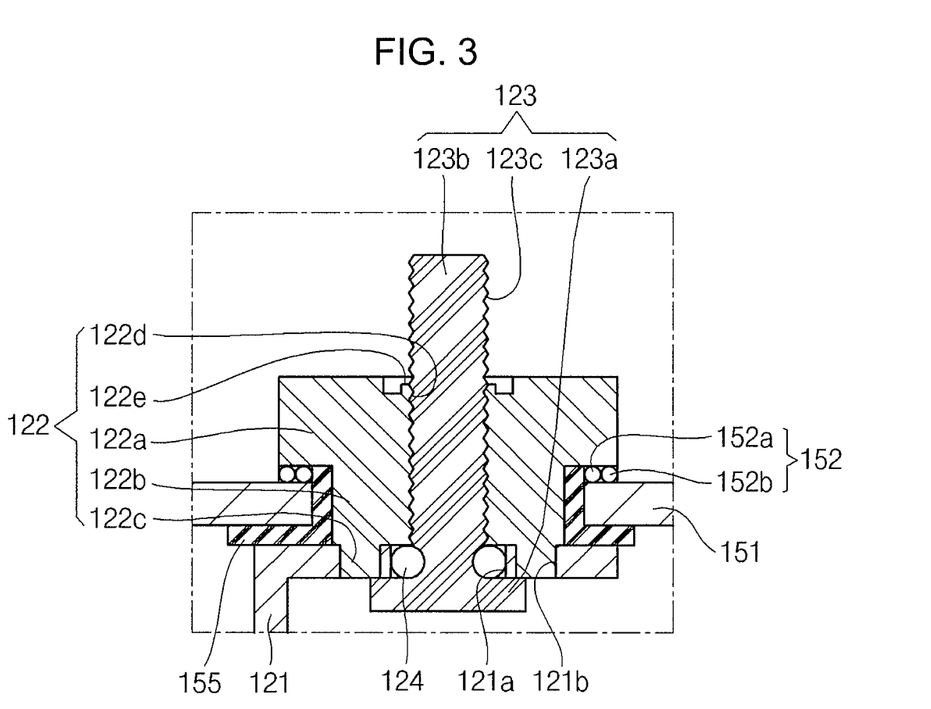
FIG. 3 is an enlarged sectional view illustrating portion A of FIG. 2.

FIG. 1 is a perspective view illustrating a secondary battery 100 according to an embodiment. FIG. 2 is a sectional view of the secondary battery 100 taken along line I-I' of FIG. 1. FIG. 3 is an enlarged sectional view illustrating portion A of FIG. 2.

Referring to FIGS. 1 through 3, the secondary battery 100 of the current embodiment includes an electrode assembly 110, a first terminal 120, a second terminal 130, a case 140, and a cap assembly 150.

The electrode assembly 110 is formed by winding or stacking a first electrode plate 111, a separator 113, and a second electrode plate 112 which have a thin plate or film shape. The first electrode plate 111 may function as a negative electrode, and the second electrode plate 112 may function as a positive electrode. Alternatively, the first electrode plate 111 and the second electrode plate 112 may function oppositely.

The first electrode plate 111 is formed by applying a first electrode active material such as graphite or carbon to a first electrode collector formed of metal foil such as nickel or copper foil. The first electrode plate 111 includes a first electrode non-coating portion 111a to which the first electrode active metal is not applied. The first electrode non-coating portion 111a functions as a current flow passage between the first electrode plate 111 and the outside of the first electrode plate 111. In the current embodiment, materials that can be used to form the first electrode plate 111 are not limited to the above-mentioned materials.

The second electrode plate 112 is formed by applying a second electrode active material such as a transition metal oxide to a second electrode collector formed of metal foil such as aluminum foil. The second electrode plate 112 includes a second electrode non-coating portion 112a to which the second electrode active metal is not applied. The second electrode non-coating portion 112a functions as a passage for a current between the second electrode plate 112 and the outside of the second electrode plate 112. In the current embodiment, materials that can be used to form the second electrode plate 112 are not limited to the above-mentioned materials.

The polarities of the first and second electrode plates 111 and 112 may be reversed with respect to each other.

The separator 113 may be located between the first electrode plate 111 and the second electrode plate 112 to prevent a short circuit and allow movement of lithium ions. The separator 113 may be formed of a polyethylene film, a polypropylene film, or a film including polyethylene and polypropylene. In the current embodiment, materials that can be used to form the separator 113 are not limited to the above-mentioned materials.

The first and second terminals 120 and 130 are coupled to both end parts of the electrode assembly 110 in a manner such that the first and second terminals 120 and 130 are electrically connected to the first and second electrode plates 111 and 112, respectively.

Substantially, the electrode assembly 110 is accommodated in the case 140 together with electrolyte. The electrolyte may include an organic solvent such as ethylene carbonate (EC), propylene carbonate (PC), diethyl carbonate (DEC), ethyl methyl carbonate (EMC), and dimethyl carbonate (DMC); and a lithium salt such as $LiPF_6$ or $LiBF_4$. The electrolyte may be liquid, solid, or gel.

The first terminal 120 is usually formed of a metal or an equivalent thereof, and is electrically connected to the first electrode plate 111. The first terminal 120 includes a first collecting plate 121, a first terminal plate 122, a first coupling terminal 123, and a first coupling ring 124.

The first collecting plate 121 makes contact with the first electrode non-coating portion 111a protruding from an end of the electrode assembly 110. Substantially, the first collecting plate 121 is welded to the first electrode non-coating portion 111a. The first collecting plate 121 is coupled to a lower side of a cap plate 151 (described later). The first collecting plate 121 has an approximately reverse L-shape, and a terminal hole 121a is formed in the upper portion of the first collecting plate 121. The first coupling terminal 123 is fitted and coupled to the terminal hole 121a. Protrusion holes 121b are formed at both sides of the terminal hole 121a. Protrusions 122c of the first terminal plate 122 are fitted and coupled to the protrusion holes 121b. For example, the first collecting plate 121 is formed of copper or a copper alloy. However, the material of the first collecting plate 121 is not limited thereto.

The first terminal plate 122 is inserted through the cap plate 151 and is located on one side (the exterior side or top side) of the cap plate 151. The first terminal plate 122 is electrically connected to the first collecting plate 121. The first terminal plate 122 includes a body 122a and a protrusion part 122b, and a penetration hole extends through a center portion of the first terminal plate 122. A bolt part 123b of the first coupling terminal 123 may be coupled to the penetration hole, which may include a screw thread 122d. The body 122a is coupled to the topside of the cap plate 151 and has an approximately hexahedral shape. A pressing region 122e is formed on a center portion of the body 122a around the penetration hole. After the first coupling terminal 123 is coupled to the first terminal plate 122, the pressing region 122e may be pressed to fix the first coupling terminal 123 to the first terminal plate 122 by compression. The protrusion part 122b protrudes downward from the body 122a and has an approximately hexahedral shape. The protrusion part 122b is inserted through the cap plate 151 and is electrically connected to the first collecting plate 121. The protrusions 122c are formed on the protrusion part 122b at both sides of the penetration hole. The protrusions 122c are coupled to the protrusion holes 121b of the first collecting plate 121 so that the first terminal plate 122 and the first collecting plate 121 can be electrically connected to each other. The first terminal plate 122 is electrically insulated from the cap plate 151. For example, the first terminal plate 122 may be formed of copper, copper alloy, or an equivalent thereof. However, the material of the first terminal plate 122 is not limited thereto. The first terminal plate 122 and the cap plate 151 are insulated from each other.

The first coupling terminal 123 is inserted through the first terminal plate 122 and is coupled to the first collecting plate 121 at the bottom side of the cap plate 151. The first coupling terminal 123 includes a head part 123a and the bolt part 123b. The head part 123a is coupled to the terminal hole 121a of the first collecting plate 121. The head part 123a is bigger than the terminal hole 121a so that the first coupling terminal 123 cannot be separated from the first collecting plate 121. The bolt part 123b protrudes upward from the head part 123a and includes a screw thread 123c. The bolt part 123b is coupled to the terminal hole 121a of the first collecting plate 121 and the penetration hole of the first terminal plate 122. In detail, the screw thread 123c of the bolt part 123b is engaged with the screw thread 122d formed on the penetration hole. In other words, since the first coupling terminal 123 and the first terminal plate 122 are coupled to each other by a bolt-nut structure, the first coupling terminal 123 and the first terminal plate 122 can be firmly coupled to each other. Furthermore, the first coupling terminal 123 can be fixed to prevent rotation by pressing the pressing region 122e of the first terminal plate 122 against the screw thread 123c of the first coupling terminal 123. In one embodiment, the coupling terminal 123 is formed of a material having a greater strength than a material of the first terminal plate 122. The first coupling terminal 123 may be formed of stainless steel for tighter coupling with the first terminal plate 122.

The first coupling ring 124 is located between the first collecting plate 121 and the first coupling terminal 123 for tight contact with the first collecting plate 121 and the first coupling terminal 123. The first coupling ring 124 is formed of a material such as rubber and prevents permeation of moisture into the secondary battery 100 and leakage of electrolyte from the inside of the secondary battery 100.

The second terminal 130 may be formed of a metal or an equivalent thereof. The second terminal 130 is electrically connected to the second electrode plate 112. The second terminal 130 includes a second collecting plate 131, a second terminal plate 132, a second coupling terminal 133, and a second ring 134. The second terminal 130 may have substantially the same shape as the first terminal 120 and thus, a detailed description thereof will not be repeated. The second collecting plate 131 and the second terminal plate 132 may be formed of aluminum, an aluminum alloy, or an equivalent thereof. However, the current embodiment is not limited to such materials.

In addition, the second terminal plate 132 may be electrically connected to the cap plate 151. In this case, the case 140 and the cap plate 151 (that will be described below in detail) may have the same polarity (for example, positive polarity) as the second terminal 130.

As described above, according to the embodiment, the collecting plates 121 and 131 are coupled to the terminal plates 122 and 132 through the coupling terminals 123 and 133. In other words, the collecting plates 121 and 131 that collect electricity from the electrode assembly 110 are coupled to the terminal plates 122 and 132 through the coupling terminals 123 and 133 that will be coupled to bus bars. Therefore, both the electricity collecting efficiency and coupling reliability of the secondary battery 100 can be improved. In addition, since the collecting plates 121 and 131 and the terminal plates 122 and 132 are electrically connected through the coupling terminals 123 and 133, the secondary battery 100 can have a simple structure and a shorter current passage for lower terminal electric resistance.

Furthermore, according to the embodiment, since the coupling terminals 123 and 133 and the terminal plates 122 and 132 are coupled by a bolt-nut structure, rotation of the coupling terminals 123 and 133 can be prevented. Therefore, the coupling between the coupling terminals 123 and 133 and the terminal plates 122 and 132 can be more firm. In addition, after coupling bus bars to the coupling terminals 123 and 133, nuts can be tightened to the coupling terminals 123 and 133 for more secure coupling between the coupling terminals 123 and 133 and the bus bars.

Furthermore, according to embodiment, since current passages from the collecting plates 121 and 131 to bus bars are formed through the terminal plates 122 and 132 having relatively large sectional areas, the electric resistances of the terminals 120 and 130 can be reduced.

The case 140 is formed of a conductive metal such as aluminum, aluminum alloy, or steel plated with nickel. The case 140 has an approximately hexahedral shape with an opening so that the electrode assembly 110, the first terminal 120, and the second terminal 130 can be inserted and placed in the case 140. FIG. 2 illustrates a state where the case 140 and the cap assembly 150 are coupled to each other. As will be appreciated, the peripheral part of the cap assembly 150 substantially corresponds to the opening of the case 140. The inner surface of the case 140 may be treated to be electrically insulated from the electrode assembly 110, the first and second terminals 120 and 130, and the cap assembly 150.

The cap assembly 150 is coupled to the case 140. In detail, the cap assembly 150 includes the cap plate 151, sealing gaskets 152, a plug 153, a safety vent 154, and insulation members 155. Alternatively, the sealing gaskets 152 and the insulation members 155 may be considered as elements of the first and second terminals 120 and 130.

The cap plate 151 closes the opening of the case 140. The cap plate 151 may be formed of the same material as the case 140. For example, the cap plate 151 may be coupled to the case 140 by laser welding. As described above, the cap plate 151 may have the same polarity as the second terminal 130. In this case, the cap plate 151 and the case 140 may have the same polarity.

The sealing gaskets 152 are located between the cap plate 151 and the first and second terminal plates 122 and 132. In detail, the sealing gaskets 152 are located between the cap plate 151 and the bodies 122a and 132a of the first and second terminal plates 122 and 132 for sealing between the cap plate 151 and the first and second terminal plates 122 and 132. The sealing gaskets 152 prevent permeation of moisture into the secondary battery 100 or leakage of electrolyte from the inside of the secondary battery 100. Each of the sealing gaskets 152 includes a first seal gasket 152a and a second seal gasket 152b. The first seal gasket 152a is located inside the second seal gasket 152b and is surrounded by the second seal gasket 152b. Since each of the sealing gaskets 152 is two parts, tighter sealing can be provided between the cap plate 151 and the first terminal plate 122 and the second terminal plate 132.

The plug 153 closes an electrolyte injection hole 151a of the cap plate 151. The safety vent 154 is located within a vent hole 151b of the cap plate 151, and a notch 154a is formed in the safety vent 154 so that the safety vent 154 can be opened at a preset pressure.

The insulation members 155 are located between the cap plate 151 and the first and second collecting plates 121 and 131 to prevent a short circuit. In other words, the insulation members 155 prevent a short circuit between the first collecting plate 121 and the cap plate 151 and a short circuit between the second collecting plate 131 and the cap plate 151. The insulation members 155 are also located between the cap plate 151 and the protrusion parts 122b and 132b of the first and second terminal plates 122 and 132 so that a short circuit can be prevented between the cap plate 151 and the first and second terminal plates 122 and 132.

Figure 4A:
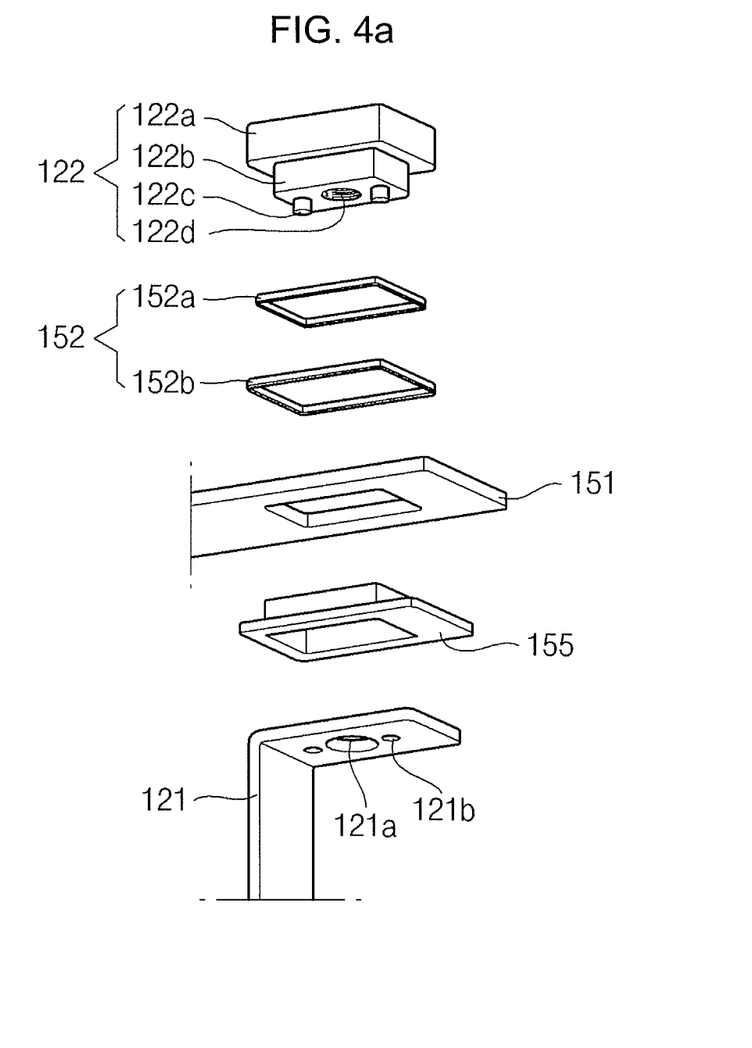
FIGS. 4A through 4C are views illustrating a method of assembling a terminal of the secondary battery according to an embodiment.
Figure 4B:
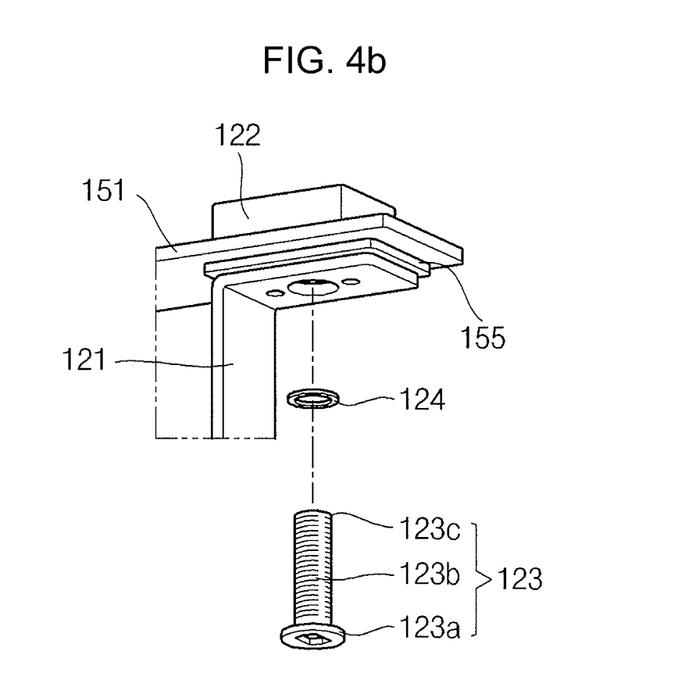
Figure 4C:
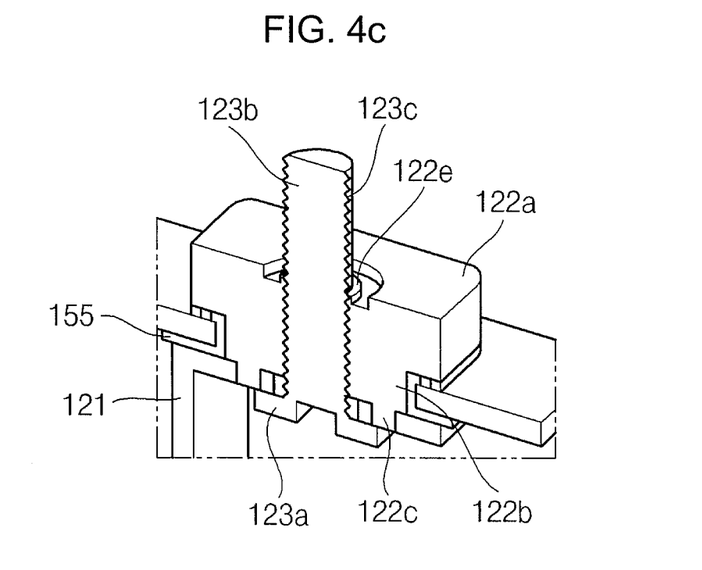

FIGS. 4A through 4C are views for sequentially explaining a method of assembling the terminal of the secondary battery according to an embodiment. In the following described, first and second terminals have the same structure. Thus, an explanation will be given based on the first terminal.

Referring to FIG. 4A, the insulation member 155 and the first collecting plate 121 are coupled to each other at a position under the first collecting plate 121. Next, the sealing gasket 152 and the first terminal plate 122 are coupled to each other at a position above the cap plate 151. Thus, the first terminal plate 122 is electrically insulated from the cap plate 151 by the sealing gasket 152 and the insulation member 155. The protrusions 122c formed on the first terminal plate 122 are coupled to the protrusion holes 121b of the first collecting plate 121.

Referring to FIG. 4B, the first coupling terminal 123 is inserted through the cap plate 151 from the bottom side of the cap plate 151. In detail, the first coupling terminal 123 is inserted through the terminal hole 121a formed in the first collecting plate 121 and the penetration hole formed in the first terminal plate 122. The first coupling ring 124 is located between the first collecting plate 121 and the first coupling terminal 123 for tight contact with the first collecting plate 121 and the first coupling terminal 123. In addition, the screw thread 123c formed on the first coupling terminal 123 is engaged with the screw thread 122d formed on the first terminal plate 122. Therefore, since the first coupling terminal 123 and the first terminal plate 122 are coupled to each other by a bolt-nut structure, the first coupling terminal 123 and the first terminal plate 122 can be firmly coupled to each other.

Referring to FIG. 4C, the pressing region 122e of the first terminal plate 122 is pressed to the first coupling terminal 123. Then, rotation of the first coupling terminal 123 is prevented, and thus the coupling between the first coupling terminal 123 and the first terminal plate 122 can be maintained more securely.

Figure 5:
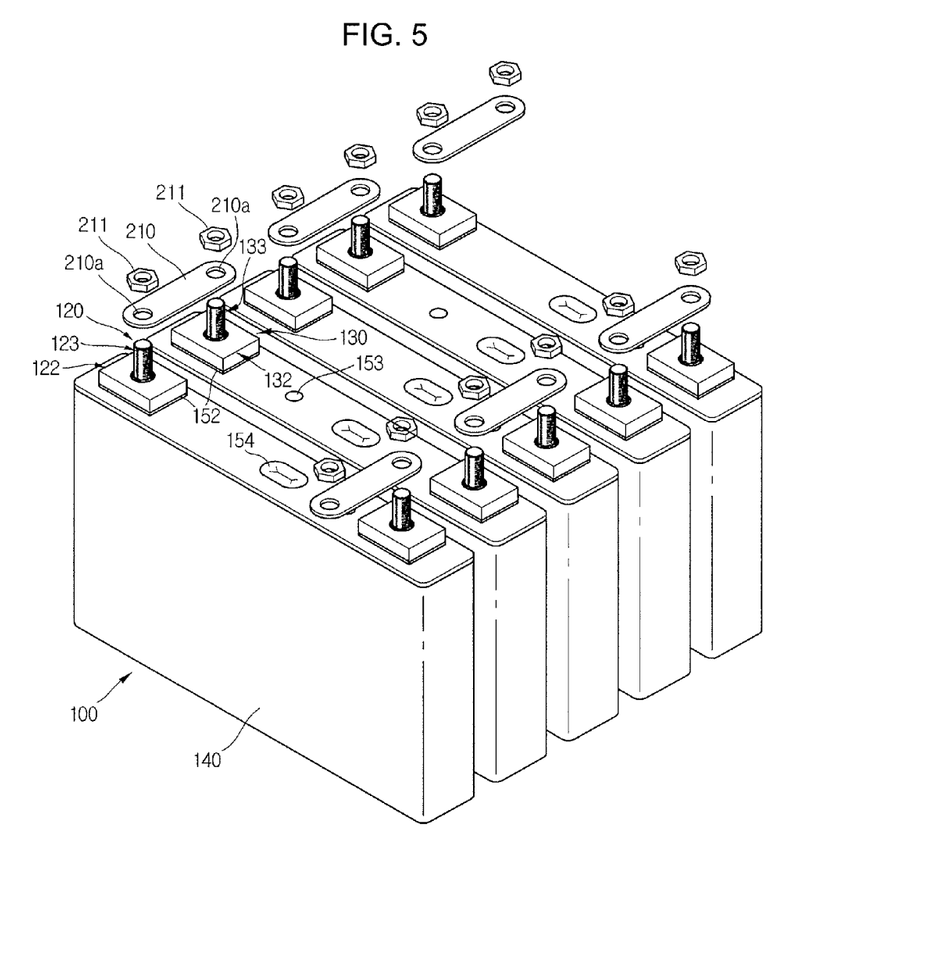
FIG. 5 is a view illustrating a method of coupling secondary batteries with bus bars according to an embodiment.

FIG. 5 is a view for explaining a method of coupling secondary batteries with bus bars according to an embodiment.

As illustrated in FIG. 5, a plurality of secondary batteries 100 may be connected in series and/or in parallel with each other by using conductive bus bars 210. Penetration holes 210a are formed at both sides of the bus bars 210, and first and second coupling terminals 123 and 133 of the secondary batteries 100 are coupled to the penetration holes 210a. Nuts 211 are coupled to the first and second coupling terminals 123 and 133 by applying large torque to the nuts 211.

Therefore, since the bus bars 210 are coupled to the first and second coupling terminals 123 and 133 by using the nuts 211, the bus bars 210 can be in tight contact with first and second terminal plates 122 and 132.

Accordingly, since the bus bars 210 are securely coupled to the first and second coupling terminals 123 and 133 by using the nuts 211, the coupling between the bus bars 210 and the first and second coupling terminals 123 and 133 can be more secure. In addition, since relatively large current passages are formed by the first and second terminal plates 122 and 132 and the bus bars 210, terminal resistance can be reduced.

Figure 6:
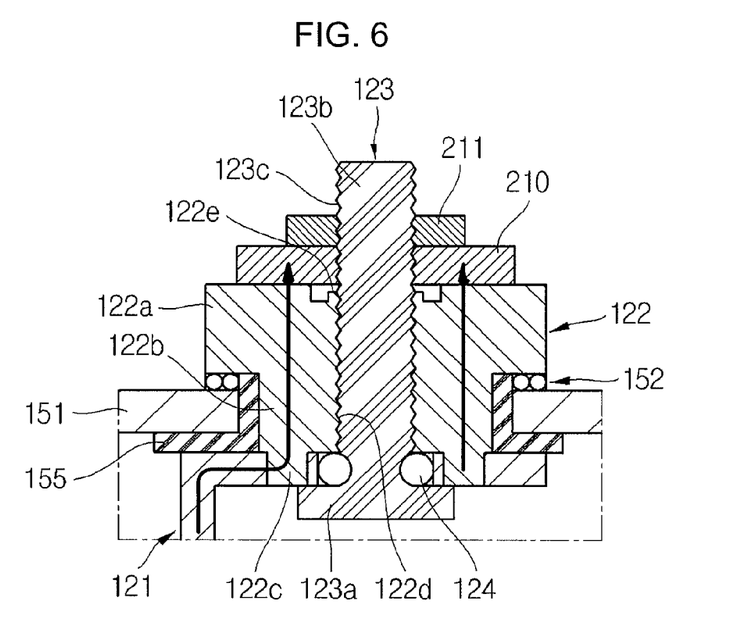
FIG. 6 is a sectional view illustrating a coupled state of a terminal of a secondary battery and a bus bar according to an embodiment.

FIG. 6 is a sectional view illustrating a coupled state of a terminal of a secondary battery and a bus bar according to an embodiment.

Referring to FIG. 6, a bus bar 210 is coupled to a coupling terminal 123. In detail, a bolt part 123b of the coupling terminal 123 is coupled to a penetration hole 210a of the bus bar 210. A nut 211 is coupled to a portion of the bolt part 123b above the bus bar 210 so that the bus bar 210 can be brought into tight contact with a terminal plate 122. Since the bus bar 210 is coupled to the terminal plate 122 having a relatively large sectional area, a wide current passage can be formed to reduce electric contact resistance. Furthermore, since the bus bar 210 is directly brought into contact with the terminal plate 122, a current passage can be shortened to reduce electric resistance.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

| REFERENCE NUMERAL | |
|---|---|
| 100: secondary battery | 110: electrode assembly |
| 120: first terminal | 121: first collecting plate |
| 122: first terminal plate | 123: first coupling terminal |
| 124: first coupling ring | 130: second terminal |
| 131: second collecting plate | 132: second terminal plate |
| 133: second coupling terminal | 134: second coupling ring |
| 140: case | 150: cap assembly |
| 151: cap plate | 152: seal gasket |
| 153: plug | 154: safety vent |
| 155: insulation member | |

What is claimed is:

1. A secondary battery comprising:
  an electrode assembly;
  a first terminal electrically connected to the electrode assembly, wherein the first terminal comprises:
    a first collecting plate contacting the electrode assembly and having a plurality of openings;
    a first terminal plate comprising a plurality of protrusions each extending into a respective first opening of the openings; and
    a first coupling terminal extending through the first terminal plate and through a second opening of the openings, wherein the first coupling terminal is electrically coupled to the first collecting plate;
  a case housing the electrode assembly; and
  a cap assembly sealing the case.

2. The secondary battery of claim 1, wherein the first coupling terminal comprises a head and a body extending from the head.

3. The secondary battery of claim 2, wherein the head contacts the at least one protrusion.

4. The secondary battery of claim 1, wherein a first coupling ring is located between the first collecting plate and the first coupling terminal.

5. The secondary battery of claim 4, wherein the first coupling ring comprises rubber.

6. The secondary battery of claim 1, wherein the first terminal plate has a coupling opening configured to accommodate the first coupling terminal.

7. The secondary battery of claim 6, wherein the coupling opening is threaded.

8. The secondary battery of claim 7, wherein the first coupling terminal is threaded and wherein the first coupling terminal is fixed to the first terminal plate.

9. The secondary battery of claim 1, wherein the cap assembly has a cap plate and further comprising an insulation member between the cap plate and the first collecting plate.

10. The secondary battery of claim 1, wherein the cap assembly has a cap plate and further comprising at least one sealing gasket between the cap plate and the first terminal plate.

11. The secondary battery of claim 1, wherein the first terminal plate has a pressing section that is compressed against the first coupling terminal.

12. The secondary battery of claim 1, further comprising a second terminal electrically connected to the electrode assembly, wherein the second terminal comprises:
  a second collecting plate contacting the electrode assembly and having a plurality of openings;
  a second terminal plate comprising at least one protrusion extending into a first opening of the openings of the second collecting plate; and
  a second coupling terminal extending through the second terminal plate and a second opening of the openings of the second collecting plate, wherein the second coupling terminal is electrically coupled to the second collecting plate.

13. The secondary battery of claim 12, wherein the second terminal plate comprises a plurality of protrusions and wherein the second collecting plate comprises a plurality of first openings.

14. The secondary battery of claim 12, wherein a second coupling ring is located between the second collecting plate and the second coupling terminal.

15. The secondary battery of claim 1, wherein the first coupling terminal and the first terminal plate comprise different materials.

16. The secondary battery of claim 15, wherein the first coupling terminal comprises stainless steel and wherein the first terminal plate comprises copper or aluminum.

17. The secondary battery of claim 1, wherein the first coupling terminal has a greater strength than the first terminal plate.

18. A secondary battery comprising:
an electrode assembly;
a first terminal electrically connected to the electrode assembly, wherein the first terminal comprises:
   a first collecting plate contacting the electrode assembly and having a plurality of openings;
   a first terminal plate comprising a plurality of protrusions each extending into a respective first opening of the openings; and
   a first coupling terminal extending through the first terminal plate and a second opening of the openings, wherein the first coupling terminal is electrically coupled to the first collecting plate;
a case housing the electrode assembly; and
a cap assembly sealing the case, the cap assembly comprising a cap plate, wherein the first terminal plate extends into the cap plate.

\* \* \* \* \*